June 13, 1944.  E. V. SCHAAL  2,351,547
VALVE
Filed Jan. 1, 1942
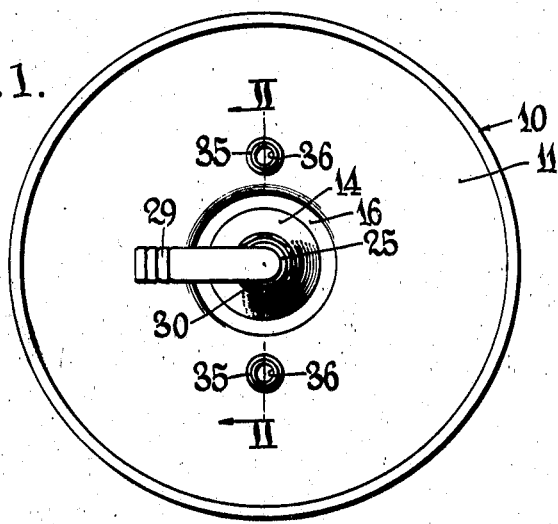
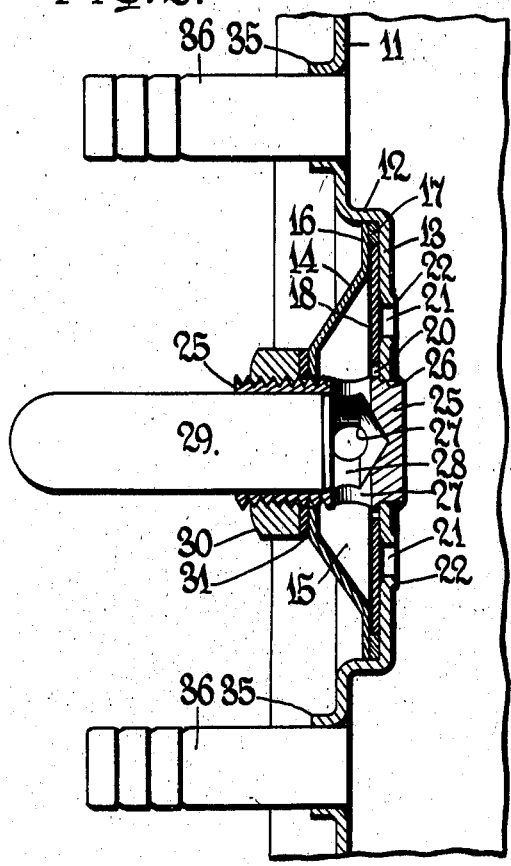
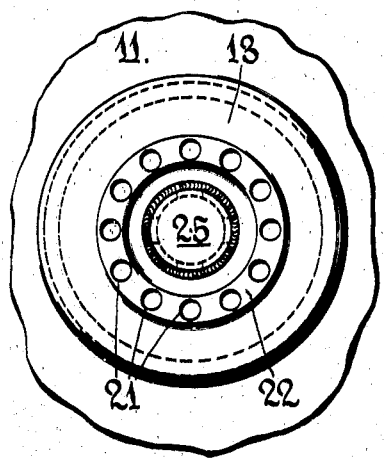
INVENTOR
Earl V. Schaal,
BY
Beau, Brooks, Buckley & Beau.
ATTORNEYS Patented June 13, 1944

2,351,547

UNITED STATES PATENT OFFICE 2,351,547

VALVE

Earl V. Schaal, East Aurora, N. Y., assignor to Trico Products Corporation, Buffalo, N. Y.

Application January 1, 1942, Serial No. 425,317

5 Claims. (Cl. 251—127)

This invention relates to valve means adapted to permit fluid flow in one direction only, such devices being commonly known in the art as check valves.

According to the present invention a check valve is provided which is simple and extremely effective, from the standpoint of both sensitivity and tightness of seal. The improved check valve means involves a minimum number of parts and in the form illustrated in the drawing and described in detail herein by way of example is applied to a fluid pressure vessel in such manner as to be incorporated with a fluid conduit which is normally provided for establishing fluid communication with such vessel. Other objects and advantages attendant upon a pursuance of the principles of the present invention will be apparent to those skilled in the art from a consideration of the specific form of the invention shown in the drawing and described in detail. It is to be understood, however, that the specific disclosure herein contained is by way of example only, and that the invention is not to be considered as limited in spirit or scope, otherwise than as defined in the appended claims.

In the accompanying drawing:

Fig. 1 is an end elevational view of a cylindrical vessel to which the device of the present invention is shown applied in exemplary form;

Fig. 2 is an enlarged cross-sectional view taken approximately on the line II—II of Fig. 1; and Fig. 3 is a fragmentary elevational view looking at the inside of the end wall of the vessel.

Throughout the several figures of the drawing like characters of reference denote like parts and the numeral 10 designates a cylindrical vessel having an end wall 11.

In the illustrated instance the wall 11 is provided with an embossed depression comprising an annular flange 12 and a bottom wall 13, the latter being substantially parallel with but offset from the wall 11 proper. A discoidal cover element 14 cooperates with the flange 12 and the bottom wall 13 to form a valve chamber 15 and in the instant form the cover element is formed frusto-conically for reasons which will presently appear. An outer marginal flange 16 of the cover element 14 seats against a spacing ring 17 disposed against the wall 13. In this manner space is provided for limited opening movement of a valve disc 18.

The valve disc 18 has a central opening 20 and the wall 13 is provided with a circular row of openings 21 disposed about the opening 20 in such manner as to be out of communication with the opening 20 when the valve disc 18 is seated against the wall 13. The portion of the wall 13 surrounding the openings 21 is preferably spaced from direct contact with the adjacent surface of the valve 18 and to this end an annular embossment 22 may be provided.

In a preferred form of the invention the valve disc 18 may be formed of a non-metallic material such as that known commercially as "Fabricoid" and, since the valve 18 is free to rotate, impressions of the openings 21, which might be formed on the surface of the valve 18 if it were in contact with the edges of the opening, would interfere with proper seating, hence the desirability of the annular embossment 22.

In the illustrated form the means for retaining the cover element 14 in securely assembled position is combined with passage means for establishing fluid flow from the valve chamber 15 and such means include a pin 25, one end of which is necked down as at 26 and secured in an opening in the bottom wall 13 as by welding, soldering, riveting or the like. The pin 25 has transverse passages 27 communicating with an axial opening 28 which is fitted with a nipple 29 or other suitable fluid conduit at one end.

As appears clearly from Fig. 2, the pin 25 extends through a central opening in the cover element 14 and is externally threaded to receive a nut 30 for applying external pressure against the cover element 14. If desired a sealing washer 31 may be interposed between the cover element and the nut 30.

Clamping pressure on the cover element 14, as applied by tightening the nut 30, has a tendency to slightly flatten the cover element 14 and consequently urge its periphery into intimate engagement with the annular flange 12 and thereby render more effective the fluid-tight condition of the valve chamber 15. In the form illustrated the wall 11 of the vessel 10 is shown as having flanged openings 35 for receiving nipples 36. The nipples 36 may be connected with any suitable conduits for establishing a fluid pressure system.

In one form the apparatus illustrated may have the nipple 29 connected with a source of sub-atmospheric pressure, such as the intake manifold of a vehicle engine or a mechanical vacuum pump. The nipples 36 may then be connected with suitable fluid motors for operating the latter. By reason of the presence of the storage vessel 10 and the check valve arrangement the application of vacuum to the vessel 10 through the nipple 29 may be intermittent and variable.

What is claimed is:

1. Check valve structure comprising a supporting wall, a cup-like depression formed therein, and a cover element fitting snugly into said depression and cooperating therewith to form a valve chamber, a disc valve within said chamber adapted to seat against the bottom wall of said cup-like depression and having a central opening therein, means rigidly attached to said bottom wall and extending through said opening for adjustable engagement with said cover element to clamp the same in assembled position, said cover element being outwardly convex whereby clamping action urges the periphery of the cover element into intimate engagement with the annular wall of said depression, said bottom wall having a fluid passage whereby movement of said valve from seated position establishes fluid communication through said wall.

2. Check valve structure comprising a supporting wall, a cup-like depression formed therein, and a cover element fitting snugly into said depression and cooperating therewith to form a valve chamber, said cover element having a central opening therein, a disc valve within said chamber adapted to seat against the bottom wall of said cup-like depression and having a central opening therein, means rigidly attached to said bottom wall and extending through said valve opening and said cover opening, and means engaging the protruding portion of said first mentioned means and bearing against said cover element to clamp the same in assembled position, said cover element being outwardly convex whereby clamping action urges the periphery of the cover element into intimate engagement with the annular wall of said depression, said bottom wall having a fluid passage whereby movement of said valve from seated position establishes fluid communication through said wall.

3. A check valve comprising a wall having a portion thereof depressed to form a recess, the bottom of the recess being formed with a circular series of ports and constituting a valve seat, a bodily movable annular valve member engaging the seat, a sheet-like cover element having its margin fitting snugly within the recess and supported a distance above the valve member to define the extent of bodily movement of the latter, a tubular member fixed to and upstanding from the bottom within the series of ports, the upper end of the tubular member being open and protruding through the cover element, the central portion of the cover element being raised about the tubular member to define with the bottom a chamber for the valve member, the tubular member having radial passage means opening into the chamber, and means engaged with the protruding end of the tubular member and reacting on the raised central portion of the cover element to expand the outlying margin of the latter firmly into the recess.

4. A check valve comprising a wall having a portion thereof depressed to form a recess, the bottom of the recess being formed with an annular groove having a circular series of ports, the opposite sides of the rim of the groove forming a valve seat, a bodily movable annular valve member engaging the seat, a sheet-like cover element having its margin fitting snugly within the recess and supported a distance above the valve member to define the extent of bodily movement of the latter, a tubular member fixed to and upstanding from the bottom within the series of ports, the upper end of the tubular member being open and protruding through the cover element, the central portion of the cover element being raised about the tubular member to define with the bottom a chamber for the valve member, the tubular member having radial passage means opening into the chamber, and means engaged with the protruding end of the tubular member and reacting on the raised central portion of the cover element to expand the outlying margin of the latter firmly into the recess.

5. A check valve comprising a wall having a portion thereof depressed to form a recess, the bottom of the recess being formed with a circular series of ports and constituting a valve seat, a bodily movable annular valve member engaging the seat, a sheet-like cover element having its margin fitting snugly within the recess and supported a distance above the valve member to define the extent of bodily movement of the latter, a tubular member fixed to and upstanding from the bottom within the series of ports, the upper end of the tubular member being open and protruding through the cover element, the central portion of the cover element being frustro-conical whereby its central portion is raised and engages about the tubular member to define with the bottom a chamber for the valve member, the tubular member having radial passage means opening into the chamber, and means engaged with the protruding end of the tubular member and reacting on the raised central portion of the cover element to expand the outlying margin of the latter firmly into the recess.

EARL V. SCHAAL.